United States Patent
Park

(10) Patent No.: US 6,415,100 B1
(45) Date of Patent: Jul. 2, 2002

(54) APPARATUS AND METHOD FOR SUB-PICTURE ENCODING

(75) Inventor: Pan-gie Park, Suwon (KR)

(73) Assignee: Samsung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/323,207

(22) Filed: Jun. 1, 1999

(30) Foreign Application Priority Data

May 29, 1998 (KR) .............................. 98/19793

(51) Int. Cl.⁷ ................................. H04N 5/91
(52) U.S. Cl. .................... 386/95; 386/125; 386/126
(58) Field of Search ................ 386/46, 95, 111, 386/112, 125, 126, 109, 1, 98; 348/468

(56) References Cited

U.S. PATENT DOCUMENTS

| | | | |
|---|---|---|---|
| 5,237,412 A | * 8/1993 | Nakajima et al. | 386/95 |
| 5,715,356 A | * 2/1998 | Hirayama et al. | 386/96 |
| 5,758,007 A | 5/1998 | Kitamura et al. | |
| 5,999,696 A | * 12/1999 | Tsuga et al. | 386/126 |
| 6,031,963 A | * 2/2000 | Kitamura et al. | 386/109 |
| 6,115,529 A | * 9/2000 | Park | 386/1 |

FOREIGN PATENT DOCUMENTS

| | | |
|---|---|---|
| GB | EP0725541 A2 | 8/1996 |
| GB | EP0725541 A3 | 11/1996 |
| GB | EP0808072 A2 | 11/1997 |
| JP | hei10-13786 | 9/1997 |
| JP | hei11-168702 | 6/1999 |
| JP | hei11-215466 | 8/1999 |
| JP | hei11-234620 | 8/1999 |

OTHER PUBLICATIONS

Video Demystified, a Handbook for the Digital Engineer Second Edition, High Text publications, Harris Semiconductor, by Keith Jack, 1996, cover page, copyright page and pp. 213–230 and 232.

* cited by examiner

*Primary Examiner*—Huy Nguyen
(74) *Attorney, Agent, or Firm*—Robert E. Bushnell, Esq.

(57) ABSTRACT

An apparatus and method for encoding closed-caption data into a sub-picture used in a rewritable recording medium is provided. The apparatus includes: a caption decoder for decoding the caption signal in the television signal; and a sub-picture encoder for coding the closed-caption data decoded by the caption decoder into the sub-picture data defined for the rewritable recording medium according to a predetermined format. Therefore, a television signal containing a closed caption can be recorded on a recording medium and such closed-caption data can be reproduced by a video playback system without an extra closed-caption decoder.

29 Claims, 3 Drawing Sheets

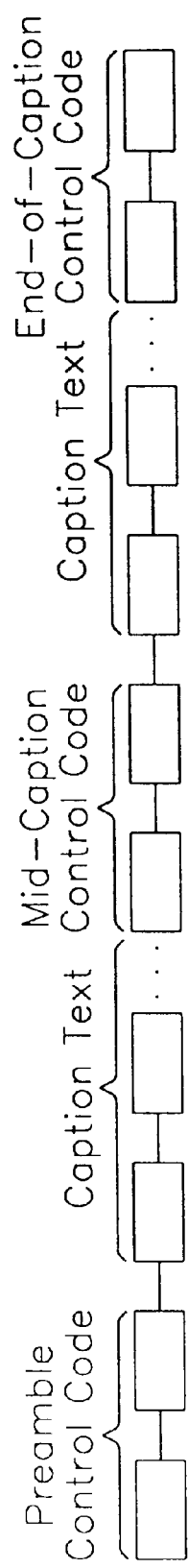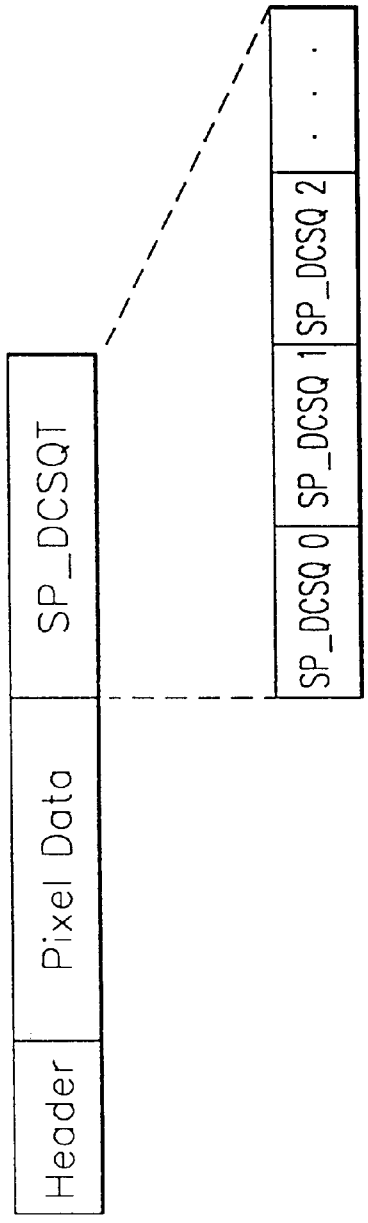

FIG. 3 *(Prior Art)*

| PARAMETER | CONTENT |
|---|---|
| FSTA_DSP | FORCE START OF DISPLAY |
| STA_DSP | STARTING TIME OF DISPLAY |
| STP_DSP | ENDING TIME OF DISPLAY |
| SET_COLOR | SET COLOR OF EACH PIXEL |
| SET_CONTR | SET MIXING RATIOS OF PIXELS WITH MAIN PICTURE |
| SET_DAREA | SET DISPLAY AREA OF PIXEL DATA |
| SET_DSPXA | SET DISPLAY START POSITION OF PIXEL DATA |
| CHG_COLCON | CHANGE COLOR AND MIXING RATIO |
| CMD_END | END OF PARAMETER |

FIG. 4

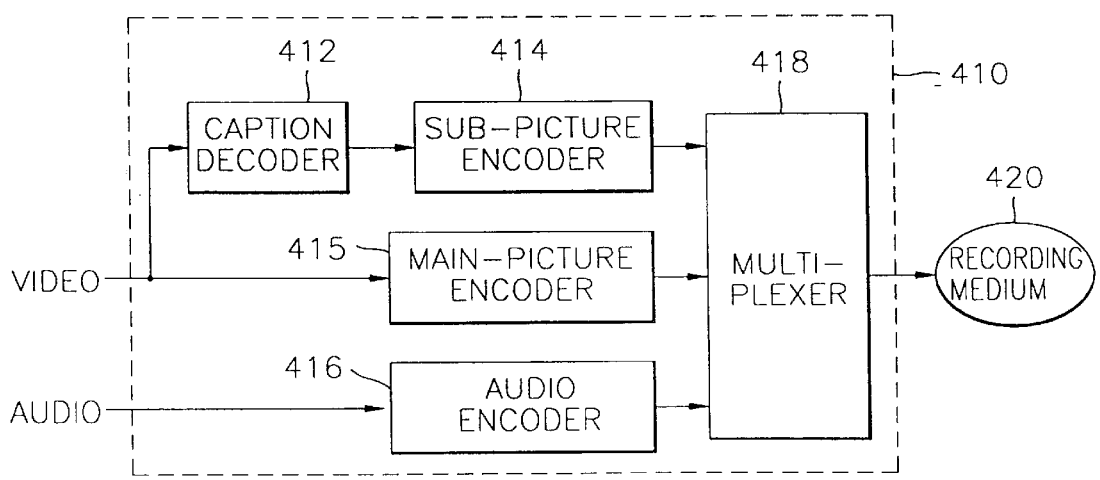

APPARATUS AND METHOD FOR SUB-PICTURE ENCODING

CLAIM OF PRIORITY

This application makes reference to, incorporates the same herein, and claims all benefits accruing under 35 U.S.C. §119 from my application SUB-PICTURE ENCODING APPARATUS AND METHOD THEREOF filed with the Korean Industrial Property Office on May 29, 1998 and there duly assigned Ser. No. 19793/1998.

BACKGROUND OF THE INVENTION

1. Field of the Invention

The present invention relates to a sub-picture encoding method and apparatus used in a rewritable optical disc, and more particularly, to an apparatus and method for encoding a closed caption into a sub-picture.

2. Description of the Related Art

In general, a closed caption is included in television programs, and the captions of the television programs are transmitted via the 21st line of 525 lines adopted by the National Television System Committee (NTSC) standard. That is, because 16 bits of data per field are transmitted according to the National Television System Committee (NTSC) standard, a maximum of 480 bits of closed-caption data are transmitted per second.

In a data structure for transmission of closed captions adopted in the United States (US) television broadcasting system, a closed caption consists of various control codes and caption texts. Such a closed caption is transmitted in the order of a Preamble Control Code, a Caption Text, a Mid-Caption Control Code, a Caption Text and an End-of-Caption Control Code. In detail, the Preamble Control Code contains display position and display color codes and is transmitted two times for reliable transmission. The Caption Text includes caption text data to be displayed. Also, in the United States (US), the caption text data utilizes a 7-bit USA Standard Code for Information Interchange (US ASCII) and a parity bit for error correction. The Mid-Caption Control Code is for changing the display color or shape of the caption data. The End-of-Caption Control Code indicates the end of one caption of data.

However, a television system or a video playback system exemplary of contemporary practice in the art requires an extra closed-caption dedicated decoder in order to display the closed caption data. That is, even though a television system or video playback system exemplary of contemporary practice in the art can record a video signal including closed-caption data, the closed-caption data cannot be reproduced without a closed-caption decoder.

SUMMARY OF THE INVENTION

It is an object of the present invention to provide a sub-picture encoding apparatus and method for encoding closed captions wherein a sub-picture is used in a rewritable recording medium such that closed-captions can be reproduced without an extra closed-caption decoder.

According to the present invention, there is provided an apparatus for encoding closed-caption caption data of a television signal into sub-picture data used in a rewritable recording medium, including: a caption decoder for decoding the caption signal in the television signal; and a sub-picture encoder for coding the closed-caption data decoded by the caption decoder into the sub-picture data defined for the rewritable recording medium according to a predetermined format.

Also, according to the present invention, there is provided a method for encoding closed-caption data of a television signal into sub-picture data used in a rewritable recording medium, including the steps of: (a) if a signal indicating the start of the closed caption is detected from the input television (TV) signal, setting the point in time at which the signal is detected as the ending time of display of a previously coded sub-picture data unit, and decoding text data and display information of the closed caption; (b) if a signal indicating the ending of the closed caption is detected, coding the decoded text data of the closed caption into a format defined for the rewritable recoding medium, and setting display parameters of the sub-picture from the decoded display information; and (c) if the step (b) is terminated, setting the point in time at which the setting of parameters of the step (b) is completed as the starting time of display of the current coded sub-picture unit.

BRIEF DESCRIPTION OF THE DRAWINGS

A more complete appreciation of the invention, and may of the attendant advantages thereof, will be readily apparent as the same becomes better understood by reference to the following detailed description when considered in conjunction with the accompanying drawings in which like reference symbols indicate the same or similar components, wherein:

FIG. 1 shows the data structure for transmission of closed-caption data adopted in the United States (US) television broadcasting system exemplary of contemporary practice in the art;

FIG. 2 shows the structure of a sub-picture unit;

FIG. 3 shows the kinds of parameters contained in the sub-picture display control sequence of FIG. 2;

FIG. 4 is a block diagram of a recording system adopting a sub-picture encoding apparatus according to the present invention.

DESCRIPTION OF THE PREFERRED EMBODIMENTS

Figure 5:
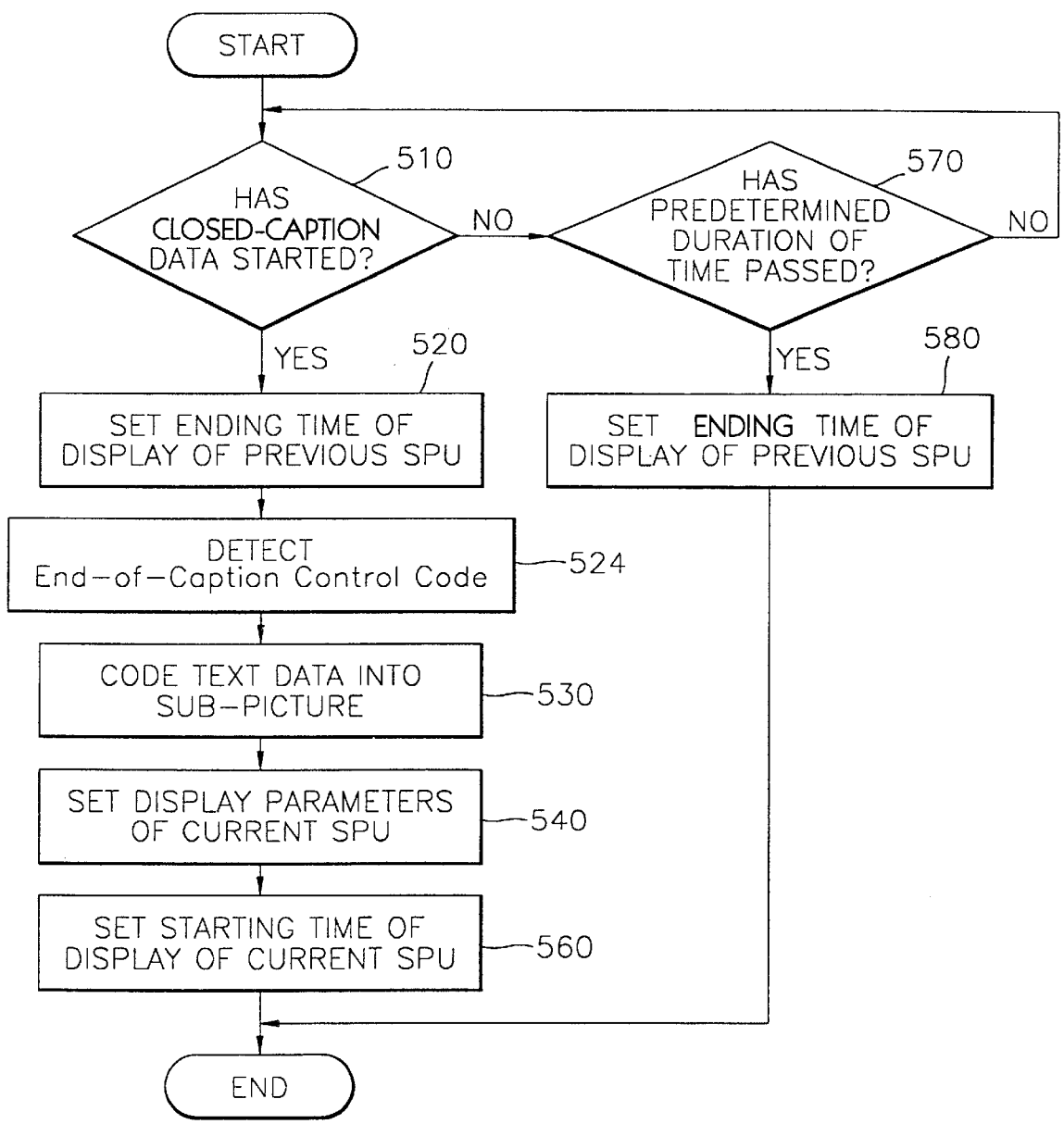
FIG. 5 is a flowchart illustrating a method for encoding caption data into sub-picture data according to the present invention.

FIG. 1 shows the data structure for transmission of closed captions adopted in the United States (US) television broadcasting system exemplary of contemporary practice in the art. A closed caption consists of various control codes and caption texts as shown in FIG. 1. Such a closed caption is transmitted in the order of a Preamble Control Code, a Caption Text, a Mid-Caption Control Code, a Caption Text and an End-of-Caption Control Code. In detail, the Preamble Control Code contains display position and display color codes and is transmitted two times for reliable transmission. The Caption Text includes caption text data to be displayed. Also, in the United States (US), the caption text data utilizes a 7-bit USA Standard Code for Information Interchange (US ASCII) and a parity bit for error correction. The Mid-Caption Control Code is for changing the display color or shape of the caption data. The End-of-Caption Control Code indicates the end of one caption of data.

In general, digital versatile discs use a main picture coded by the Moving Picture Experts Group (MPEG) standard and a sub-picture encoded by a separate method. The sub-picture is used in order to display lyric lines on a monitor in Karaoke systems or in order to display a cinema caption, for example.

FIG. 2 shows the structure of a sub-picture unit which is the basic unit of sub-picture data used in a digital versatile disc (DVD). Referring to FIG. 2, the sub-picture data includes a Header having general information about the sub-picture unit, Pixel Data compressed from actual sub-picture data, and a sub-picture display control sequence table (SP-DCSQT) having a plurality of sub-picture display control sequences (SP_DCSQ 0, SP_DCSQ 1, SP_DCSQ 2 . . . ) which each contain various display control parameters about the sub-picture data and temporal information to execute those parameters. The temporal information contained in the sub-picture display control sequences is used to synchronize the sub-picture with audio and video signals.

Each sub-picture display control sequence includes various parameters relating to the display of a sub-picture. Referring now to FIG. 3, FIG. 3 illustrates the kinds of parameters included in a sub-picture display control sequence of FIG. 2. The parameters of FIG. 3 include FSTA_DSP for indicating a forced start of display regardless of the possibility of display, STA_DSP for indicating the starting time of display of the sub-picture, STP_DSP for indicating the ending time of display of the sub-picture, SET_COLOR for setting the color of each pixel, SET_CONTR for setting the mixing ratio of each pixel with the main-picture, SET_DAREA for setting the display area of the sub-picture data, SET_DSPXA for setting the display start position of compressed pixel data, CHG_COLCON for changing the color and mixing ratio of pixels belonging to a specific pixel, and CMD_END for indicating the last parameter. Because such parameters are in the sub-picture display control sequence, a simple animation can be implemented by changing the pattern of display, and the color and mixing ratios of pixels.

FIG. 4 is a block diagram of a recording system adopting a sub-picture encoding apparatus according to the present invention. The recording system includes a receiver encoder 410 and a recording medium 420. The receiver encoder 410, which receives video and audio signals, such as of television signals, includes a caption decoder 412, a sub-picture encoder 414, a main-picture encoder 415, an audio encoder 416 and a multiplexer 418. In this embodiment, a digital versatile disc (DVD) is adopted as the recording medium 420, for example.

Continuing with reference to FIG. 4, receiver encoder 410 encodes received audio and video signals and multiplexes the encoded signals. Here, the audio signal is coded by the audio encoder 416 according to the Moving Picture Experts Group (MPEG) standard for audio or the AC-3 standard, and the video signal is coded by the main-picture encoder 415 according to a format such as the Moving Picture Experts Group (MPEG) standard for video. However, when the input signal to the receiver encoder 410 is a video signal having a closed caption, the caption decoder 412 extracts the closed-caption data from the received video signal. The sub-picture encoder 414 codes the extracted closed caption data into the format defined for the digital versatile disc (DVD). The multiplexer 418 multiplexes the sub-picture signal coded by the sub-picture encoder 414, the main-picture signal coded by the main-picture encoder 415 and the audio signal coded by the audio encoder 416. Then, the video and audio signals multiplexed by multiplexer 418 in the receiver encoder 410 are recorded on the recording medium 420.

Referring now to FIG. 5, FIG. 5 is a flowchart illustrating a method for encoding closed-caption data into sub-picture data according to the present invention. First, when a video signal having closed-caption data is received, a Preamble Control Code indicating the start of closed-caption data is detected in step 510. Then, the point in time at which the Preamble Control Code is detected is set as the ending time of display of the coded previous sub-picture unit (SPU) to terminate the display of the previously coded sub-picture unit (SPU) in step 520. Here, the ending time of display of the previous sub-picture unit (SPU) is set to STP_DSP (see FIG. 3) which is the parameter indicating the ending time of display. Subsequently, the closed-caption data is decoded until the End-of-Caption Control Code indicating the end of the closed caption is detected. If the End-of-Caption Control Code is detected in step 524, the text data of the closed-caption decoded by the caption decoder 412 of FIG. 4 is coded by the sub-picture encoder 414 of FIG. 4 into the sub-picture defined for the digital versatile disc (DVD) in step 530. In this embodiment, for example, run length coding is adopted as the sub-picture encoding method defined for the digital versatile disc (DVD). In the sub-picture encoding for the digital versatile disc (DVD), the pixels are classified into one of four types. However, classifying the pixels into one of two types is typically enough for coding text data such as closed-caption data.

Continuing with reference to FIG. 5, next, display parameters of the current coded sub-picture unit (SPU) are set in step 540. That is, the information about a display color or position included in the Preamble Control Code of the closed-caption data is decoded to set SET_COLOR for setting the color of each pixel, SET_CONTR for setting the mixing ratios of each pixel with the main picture, SET_DAREA for setting the display area of the sub-picture data, and SET_DSPXA for setting the display start position of the compressed pixel data, which are defined in the sub-picture as shown in FIG. 3. Also, information which cannot be available from the closed-caption data is set to an arbitrary value by a user.

Further, referring to FIG. 5, when the display parameters of the sub-picture unit (SPU) are set, the point in time at which setting the parameters is completed is set as the starting time of display of the current coded sub-picture unit (SPU) in step 560, and coding of the sub-picture unit (SPU) is terminated. Here, the starting time of display of the sub-picture unit (SPU) is set to STA_DSP (see FIG. 3) which is the parameter indicating the starting time of display of the sub-picture unit (SPU).

Meanwhile, continuing with reference to FIG. 5, when the Preamble Control Code of the closed-caption data is not detected in step 510, it is checked whether or not a predetermined duration of time passes in step 570. If the predetermined duration of time passes, it means that the closed-caption data is not present, and therefore display of the sub-picture is completed. Thus, when the predetermined duration of time passes, the ending point of the predetermined duration of time is set as the ending time of display of the previous coded sub-picture unit (SPU) in step 580, and coding of one sub-picture unit (SPU) is terminated. Otherwise, if the predetermined duration of time has not passed, the process returns to step 510 and the closed-caption data is checked continuously until the Preamble Control Code of the closed-caption data is detected. Further, setting the display time of the sub-picture unit (SPU) is unnecessary if the previously coded sub-picture unit (SPU) is not present, and the ending time of display of the same sub-picture unit (SPU) is set only once.

As described above, in the sub-picture encoding apparatus and method according to the present invention, a television signal containing a closed caption can be recorded on a recording medium and such closed-caption data can be reproduced by a video playback system advantageously without an extra closed-caption decoder. Moreover, the present invention can be applied to all optical disc recording and playback apparatuses.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not to be limited to the particular embodiments disclosed as the best mode contemplated for carrying out the present invention, but that the present invention includes all embodiments falling within the scope of the appended claims.

What is claimed is:

1. An apparatus for encoding closed-caption data of a television signal into sub-picture data used in a rewritable recording medium, comprising:

a caption decoder for extracting and decoding closed-caption data in a caption signal in a television signal; and a sub-picture encoder for coding the closed-caption data extracted and decoded by the caption decoder into sub-picture data defined for a rewritable recording medium according to a predetermined format so as to reproduce the closed-caption data when recorded on the rewritable recording medium without using a dedicated closed-caption decoder.

2. The apparatus of claim 1, further comprised of the rewritable recording medium comprising a digital versatile disc (DVD).

3. The apparatus of claim 2, further comprised of the sub-picture data being defined by a sub-picture data format for a digital versatile disc (DVD).

4. The apparatus of claim 3, further comprised of the sub-picture data for the digital versatile disc (DVD) comprising:

a header including general information about a sub-picture corresponding to the sub-picture data;

pixel data compressed from the sub-picture data; and a sub-picture display control sequence table including display control parameters for the sub-picture data.

5. The apparatus of claim 4, further comprised of the display control parameters for the sub-picture data comprising:

a parameter for indicating a forced start of display regardless of the possibility of display;

a parameter for indicating a starting time of display of the sub-picture;

a parameter for indicating an ending time of display of the sub-picture;

a parameter for setting a color of each pixel;

a parameter for setting a mixing ratio of each pixel with a main-picture;

a parameter for setting a display area of the sub-picture data;

a parameter for setting a display start position of compressed pixel data;

a parameter for changing a color and a mixing ratio of pixels; and a parameter for indicating a last parameter.

6. The apparatus of claim 5, further comprising:

a main-picture encoder for coding a video signal according to a predetermined format;

an audio encoder for coding an audio signal; and a multiplexer for multiplexing a sub-picture signal coded by the sub-picture encoder, a main-picture signal coded by the main-picture encoder and an audio signal coded by the audio encoder.

7. The apparatus of claim 1, further comprised of the sub-picture data being defined by a sub-picture data format for a digital versatile disc (DVD).

8. The apparatus of claim 7, further comprised of the sub-picture data for the digital versatile disc (DVD) comprising:

a header including general information about a sub-picture corresponding to the sub-picture data;

pixel data compressed from the sub-picture data; and a sub-picture display control sequence table including display control parameters for the sub-picture data.

9. The apparatus of claim 8, further comprised of the display control parameters for the sub-picture data comprising:

a parameter for indicating a forced start of display regardless of the possibility of display;

a parameter for indicating a starting time of display of the sub-picture;

a parameter for indicating an ending time of display of the sub-picture;

a parameter for setting a color of each pixel;

a parameter for setting a mixing ratio of each pixel with a main-picture;

a parameter for setting a display area of the sub-picture data;

a parameter for setting a display start position of compressed pixel data;

a parameter for changing a color and a mixing ratio of pixels; and a parameter for indicating a last parameter.

10. The apparatus of claim 1, further comprising:

a main-picture encoder for coding a video signal according to a predetermined format;

an audio encoder for coding an audio signal; and a multiplexer for multiplexing a sub-picture signal coded by the sub-picture encoder, a main-picture signal coded by the main-picture encoder and an audio signal coded by the audio encoder.

11. The apparatus of claim 10, further comprised of the rewritable recording medium comprising a digital versatile disc (DVD).

12. The apparatus of claim 11, further comprised of the sub-picture data being defined by a sub-picture data format for a digital versatile disc (DVD).

13. The apparatus of claim 12, further comprised of the sub-picture data for the digital versatile disc (DVD) comprising:

a header including general information about a sub-picture corresponding to the sub-picture data;

pixel data compressed from the sub-picture data; and a sub-picture display control sequence table including display control parameters for the sub-picture data.

14. A method for encoding closed-caption data of a television signal into sub-picture data used in a rewritable recording medium, comprising the steps of:

when a signal indicating a start of a closed caption is detected from a television signal, setting a point in time at which the signal indicating the start of the closed caption is detected as an ending time of display of a previously coded sub-picture unit, and decoding text data and display information for the closed caption using a caption decoder for extracting and decoding from the television signal the text data and the display information for the closed caption;

when a signal indicating an ending of the closed caption is detected, coding the decoded text data for the closed caption into a format defined for a rewritable recording medium by a sub-picture encoder so as to reproduce the text data for the closed caption when recorded on the rewritable recording medium without using a dedicated closed-caption decoder, and setting display parameters of a sub-picture from the decoded display information for the closed caption; and setting a point in time at which the setting of the display parameters of the sub-picture from the decoded display information for the closed caption is completed as a starting time of display of a current coded sub-picture unit.

15. The method of claim 14, further comprising the step of setting an ending point of a predetermined duration of time as the ending time of display of the previously coded sub-picture unit when the signal indicating the start of the closed caption is not detected for the predetermined duration of time.

16. The method of claim 14, further comprised of setting the display parameters includes setting parameters relating to a display position of the sub-picture for the closed caption, colors of each pixel, and mixing ratios of each pixel with a main picture of the television signal.

17. The method of claim 16, further comprised of setting the display parameters with reference to information about at least one of a display color and a display position included in a Preamble Control Code of data for the closed caption.

18. The method of claim 17, further comprised of the display parameters being predetermined parameters.

19. The method of claim 16, further comprised of the display parameters being predetermined parameters.

20. The method of claim 16, further comprising the step of setting an ending point of a predetermined duration of time as the ending time of display of the previously coded sub-picture unit when the signal indicating the start of the closed caption is not detected for the predetermined duration of time.

21. The method of claim 20, further comprised of setting the display parameters with reference to information about at least one of a display color and a display position included in a Preamble Control Code of data for the closed caption.

22. The method of claim 21, further comprised of the display parameters being predetermined parameters.

23. The method of claim 20, further comprised of the display parameters being predetermined parameters.

24. The method of claim 14, further comprised of the display parameters being predetermined parameters.

25. The method of claim 24, further comprising the step of setting an ending point of a predetermined duration of time as the ending time of display of the previously coded sub-picture unit when the signal indicating the start of the closed caption is not detected for the predetermined duration of time.

26. A method for encoding closed-caption data of a television signal into sub-picture data used in a rewritable recording medium, comprising the steps of:

when a signal indicating a start of a closed caption is detected from an input television signal, setting a point in time at which the signal indicating the start of the closed caption is detected as an ending time of display of a previously coded sub-picture unit, and decoding text data and display information forth closed caption using a caption decoder for extracting and decoding from the input television signal the text data and the display information for the closed caption;

when a signal indicating an ending of the closed caption is detected, coding the decoded text data for the closed caption into a format defined for a rewritable recording medium by a sub-picture encoder so as to reproduce the text data for the closed caption when recorded on the rewritable recording medium without using a dedicated closed-caption decoder, and setting display parameters of a sub-picture from the decoded display information; and when the step of coding the decoded text data and setting the display parameters of the sub-picture is terminated, setting a point in time at which the setting of the display parameters of the sub-picture from the decoded display information is completed as a starting time of display of a current coded sub-picture unit.

27. The method of claim 26, further comprising the step of setting an ending point of a predetermined duration of time as the ending time of display of the previously coded sub-picture unit when the signal indicating the start of the closed caption is not detected for the predetermined duration of time.

28. The method of claim 26, further comprised of the display parameters being predetermined parameters that relate to a display position of the sub-picture, colors of each pixel and mixing ratios of each pixel with a main picture.

29. The method of claim 28, further comprised of the predetermined parameters being set with reference to information about any one of a display color and a display position included in a Preamble Control Code of closed-caption data.

* * * * *